United States Patent Office 3,040,093
Patented June 19, 1962

3,040,093
A-NOR-B-HOMO-STEROIDS AND PROCESS
OF PREPARING SAME
Georges Muller, Nogent-sur-Marne, André Poittevin, Les Lilas, and Roland Bardoneschi, Tremblay les Gonesses, France, assignors, by mesne assignments, to Roussel-UCLAF, S.A., Paris, France, a corporation of France
No Drawing. Filed Nov. 1, 1961, Ser. No. 149,223
Claims priority, application France Nov. 7, 1960
15 Claims. (Cl. 260—488)

The invention relates to novel A-nor-B-homo-steroids having the formula

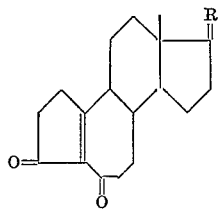

I wherein R is selected from the group consisting of =O and

and Ac is the acyl radical of an organic carboxylic acid having 2 to 7 carbon atoms, preferably a lower alkanoic acid. The invention also relates to a novel process for the preparation of A-nor-B-homo-steroids of Formula I and novel intermediates thereof.

It is an object of the invention to provide novel A-nor-B-homo-steroids of Formula I.

It is another object of the invention to provide a novel process for the preparation of A-nor-B-homo-steroids of Formula I.

It is a further object of the invention to provide novel intermediates for the A-nor-B-homo-steroids of Formula I.

These and other objects and advantages of the invention will become obvious from the following detailed description.

The A-nor-B-homo-steroids of the invention have the formula

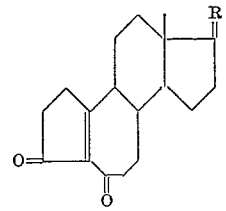

wherein R is selected from the group consisting of =O and

.H
<OAc and Ac is the acyl radical of an organic carboxylic acid having 2 to 7 carbon atoms, preferably a lower alkanoic acid.

The compounds of the new class of steroids of Formula I are useful as anabolic agents and have the added advantage of being devoid of androgenic activity.

The acyl radical of Formula I may be derived from a carboxylic acid having 2 to 7 carbon atoms. Examples of suitable acids are acetic acid, butyric acid, isobutyric acid, valeric acid, isovaleric acid, trimethyl acetic acid, methylethyl acetic acid, caproic acid, heptanoic acid and benzoic acid.

The process of the invention comprises reacting a compound having the formula

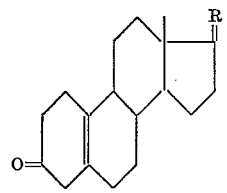

II wherein R has the above definition with ozone in an inert solvent and then reducing the ozonated product to form a compound having the formula

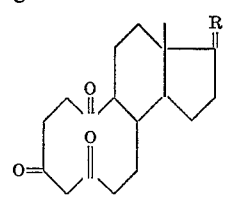

III wherein R has the above definition, cyclizing the latter under acidic conditions to form A-nor-B-homo-steroids of Formula I and recovering the latter. The reaction scheme is illustrated in Table I.

TABLE I

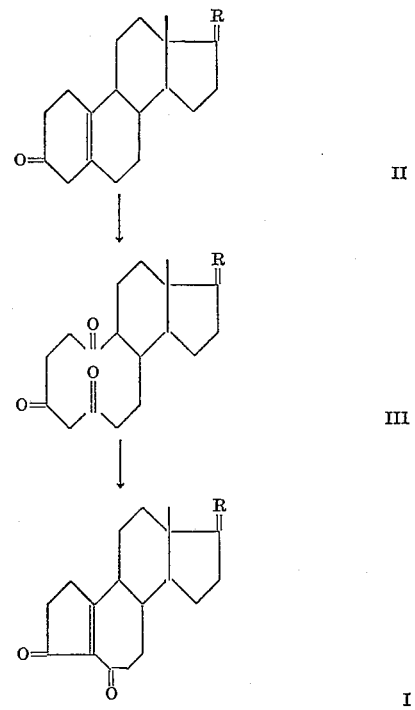

wherein R has the above definition.

A preferred mode of the process of the invention comprises reacting a compound having the formula

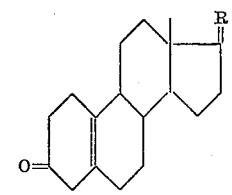

II wherein R has the above definition in a lower alkanol, a mixture of a lower alkanol and another inert solvent or a lower alkanoic acid with ozone and reducing the ozonated product to form a compound having the formula

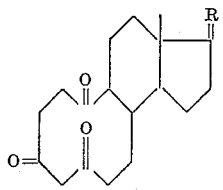

wherein R has the above definition, cyclizing the latter by refluxing with acetic acid to form A-nor-B-homo-steroids of Formula I and recovering the latter.

The reduction of the ozonated product may be performed in a number of ways. If the solvent for the first step is a lower alkanoic acid such as acetic acid, the reduction may be performed with zinc without the further addition of acetic acid. If the solvent for the first step is a lower alkanol such as methanol or ethanol or a mixture of a lower alkanol with another inert solvent such as methylene chloride, the reduction may be effected by the addition of a lower alkyl phosphite such as trimethyl phosphite to the reaction mixture.

The starting materials of the invention may be prepared by reduction of 3 ethers of the corresponding steroids having an aromatic A ring followed by gentle acid hydrolysis as taught by Birch, J. Chem. Soc., 1950, page 367, and Wilds et al., J.A.C.S., vol. 75 (1953), page 5366 for example.

In the following examples there are described several preferred embodiments to illustrate the invention. However, it should be understood that the invention is not intended to be limited to the specific embodiments.

*Example I.—Preparation of 17β-Acetoxy-A-Nor-B-Homo-Δ$^{5(10)}$-Estrene-3,6-Dione*

STEP A—OZONIZATION 4.2 grams of 17β-acetoxy-Δ$^{5(10)}$-estrene-3-one were dissolved in a mixture of 17 cc. of methylene chloride and 20 cc. of methanol. The reaction mixture was cooled to —70° C. and ozone was bubbled through the solution for a period of one hour and twenty minutes. The excess ozone was removed by a current of nitrogen, then 2.1 cc. of trimethyl phosphite were added drop by drop. The temperature of the mixture was allowed to rise to 0° C., oxygenated water was added in order to destroy the excess of trimethyl phosphite, then 100 cc. of methylene chloride were added. The organic phases were washed with water, dried and evaporated to dryness under vacuum.

The residue crystallized from isopropyl ether and supplied 3.670 grams of 17β-acetoxy-5,10-seco-estrane-3,5,10-trione, having a melting point of 142° C. and a specific rotation $[\alpha]_D^{20}=-35°$ (c.=0.5% in chloroform). The product occurred in the form of colorless prisms, very soluble in chloroform, soluble in acetone and alcohol, less soluble in ether and insoluble in water.

*Analysis.*—Calculated: C, 68.9%; H, 8.1%; O, 22.9%. Found: C, 69.0%; H, 8.1%; O, 22.8%.

The infrared spectrum showed the presence of 3 carbonyl groups by the bands at 1739, 1723 and 1711 cm.$^{-1}$.

This product is not described in literature.

STEP B—CYCLIZATION 3 grams of 17β-acetoxy-5,10-seco-estrane-3,5,10-trione were introduced under nitrogen in 12 cc. of 90% acetic acid and the reaction mixture was refluxed for a period of fifteen minutes.

The mixture was poured onto a mixture of water and ice and extracted with methylene chloride. The extracts were washed with water, dried, treated with carbon black, filtered and evaporated to dryness under vacuum. The residue crystallized from ether and supplied 1.3 grams (being a yield of 46%) of 17β-acetoxy-A-nor-B-homo-Δ$^{5(10)}$-estrene-3,6-dione having a melting point of 162° C, then 174° C, and a specific rotation $[\alpha]_D^{20}=+19°$ (c.=0.5% in chloroform).

The product occurred in the form of hexagonal prisms, very soluble in alcohol, acetone and chloroform, very slightly soluble in ether, and insoluble in water.

*Analysis.*—C$_{20}$H$_{26}$O$_4$; molecular weight=330.41. Calculated: C, 72.7%; H, 7.9%. Found: C, 72.6%; H, 7.9%.

Ultraviolet spectrum in ethanol: $\lambda_{max.}$ to 236 mμ, ε=12,600.

This product, which is not described in literature, has anabolic activity but no androgenic activity.

*Example II.—Preparation of A-Nor-B-Homo-Δ$^{5(10)}$-Estrene-3,6,17-Trione*

STEP A—OZONIZATION 1 gram of Δ$^{5(10)}$-estrene-3,17-dione was placed in suspension in 10 cc. of 85% acetic acid. The reaction mixture was cooled by an ice bath and ozone was bubbled therethrough for a period of 45 minutes. The excess ozone was removed by a stream of nitrogen. Thereafter 1 gram of powdered zinc was added and the reaction mixture was agitated for a period of several minutes. Then the zinc was vacuum filtered and 50 cc. of methylene chloride was added. The organic phase was separated, dried and evaporated to dryness under vacuum. The residue was crystallized from aqueous ethyl acetate and supplied 440 milligrams (being a yield of 40%) of 5,10-seco-estrane-3,5,10,17-tetraone, having a melting point of 168–170° C., and a specific rotation $[\alpha]_D^{20}=+45°$ C. (c.=0.5% in chloroform).

The product occurred in the form of platelets, very soluble in chloroform, soluble in acetone, slightly soluble in ether, and insoluble in water.

*Analysis.*—C$_{18}$H$_{24}$O$_4$; molecular weight=304.37. Calculated: C, 71.0%; H, 7.95%; O, 21.0%. Found: C, 70.7%; H, 7.9%; O, 21.5%.

Infrared spectrum: presence of bands corresponding to carbonyl groups at 1737, 1720 and 1706 cm.$^{-1}$.

This product is not described in literature.

STEP B—CYCLIZATION

By following the method of Step B of Example I, 3 gm. of 5,10-seco-estrane-3,5,10,17-tetraone were cyclized to 1.218 gms. of A-nor-B-homo-Δ$^{5(10)}$-estrene-3,6,17-trione, being a yield of 42%.

For analysis, the product was recrystallized from ethyl acetate and had a melting point of 176° C. and a specific rotation $[\alpha]_D^{20}=+116°$ (c.=0.5%, CHCl$_3$). The product was very soluble in acetone, benzene and chloroform and was soluble in ether and ethyl acetate.

*Analysis.*—C$_{18}$H$_{22}$O$_3$; molecular weight=286.36. Calculated: C, 75.5%; H, 7.7%. Found: C, 74.3%; H, 7.5%.

Infrared spectrum: presence of bands corresponding to carbonyl groups at 1669 cm.$^{-1}$ and 1609 cm.$^{-1}$, a shoulder at about 1740 cm.$^{-1}$ (17-one) and a maximum at 1722 cm.$^{-1}$.

This product, which is not described in literature, also possesses anabolic activity without androgenic activity.

Various modifications of the process of the invention may be made without departing from the spirit or scope thereof, and it is to be understood that the invention is to be limited only as defined in the appended claims.

We claim:

1. A compound having the formula

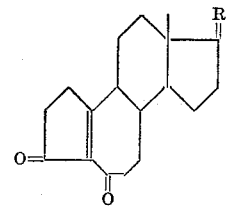

wherein R is selected from the group consisting of =O and $\diagdown^{OAc}_{H}$ and Ac is an acyl radical of an organic hydrocarbon carboxylic acid having 2 to 7 carbon atoms.

2. The compounds of claim 1 wherein the organic carboxylic acid is a lower alkanoic acid.

3. $17\beta$ - acetoxy - A - nor - B - homo - $\Delta^{5(10)}$ - estrene - 3,6-dione.

4. A-nor-B-homo-$\Delta^{5(10)}$-estrene-3,6,17-trione.

5. A compound having the formula

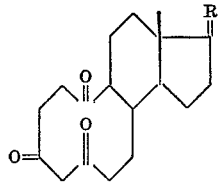

wherein R is selected from the group consisting of =O and

and Ac is an acyl radical of an organic hydrocarbon carboxylic acid having 2 to 7 carbon atoms.

6. $17\beta$-acetoxy-5,10-seco-estrane-3,5,10-trione.

7. 5,10-seco-estrane-3,5,10,17-tetraone.

8. A process for the preparation of A-nor-B-homo-steroids having the formula

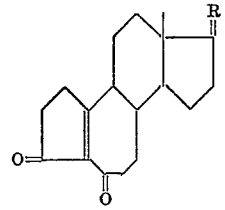

wherein R is selected from the group consisting of =O and

and Ac is an acyl radical of an organic hydrocarbon carboxylic acid having 2 to 7 carbon atoms which comprises reacting a compound having the formula

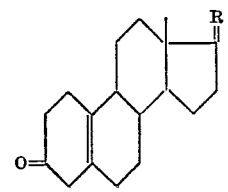

wherein R has the above definition with ozone in an inert organic solvent and then reducing the ozonated product to form a compound having the formula

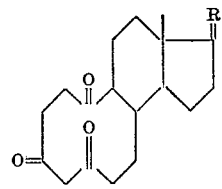

wherein R has the above definition, cyclizing the latter under acidic conditions to form A-nor-B-homo-steroids of the above formula and recovering the latter.

9. The process of claim 8 wherein the reaction with ozone is effected in a lower alkanol and the reduction is effected with a trialkyl phosphite.

10. The process of claim 8 wherein the reaction with ozone is effected in a lower alkanoic acid and the reduction is effected by adding zinc to the ozonated product in the lower alkanoic acid.

11. The process of claim 8 wherein the cyclization is effected by refluxing with acetic acid.

12. A process for the preparation of A-nor-B-homo-$\Delta^{5(10)}$-estrene-3,6,17-trione which comprises reacting $\Delta^{5(10)}$-estrene-3,17-dione with ozone in an inert organic solvent and then reducing the ozonated product to form 5,10-seco-estrane-3,5,10,17-tetraone, cyclizing the latter by refluxing with acetic acid to form A-nor-B-homo-$\Delta^{5(10)}$-estrene-3,6,17-trione and recovering the latter.

13. A process for the preparation of $17\beta$-acetoxy-A-nor-B-homo-$\Delta^{5(10)}$-estrene-3,6-dione which comprises reacting $17\beta$-acetoxy-$\Delta^{5(10)}$-estrene-3-one with ozone in an inert solvent and then reducing the ozonated product to form $17\beta$-acetoxy-5,10-seco-estrane-3,5,10-trione, cyclizing the latter by refluxing with acetic acid to form $17\beta$-acetoxy-A-nor-B-homo-$\Delta^{5(10)}$-estrene-3,6-dione and recovering the latter.

14. A process for the preparation of 5,10-seco-estrane-3,5,10,17-tetraone which comprises reacting $\Delta^{5(10)}$-estrene-3,17-dione in an inert organic solvent with ozone and then reducing the ozonated product to form 5,10-seco-estrane-3,5,10,17-tetraone and recovering the latter.

15. A process for the preparation of $17\beta$-acetoxy-5,10-seco-estrane-3,5,10-trione which comprises reacting $17\beta$-acetoxy-$\Delta^{5(10)}$-estrene-3-one in an inert organic solvent with ozone and then reducing the ozonated product to form $17\beta$-acetoxy-5,10-seco-estrane-3,5,10-trione and recovering the latter.

No references cited.